US010322679B2

(12) United States Patent
Huebner et al.

(10) Patent No.: US 10,322,679 B2
(45) Date of Patent: Jun. 18, 2019

(54) VEHICLE INTERIOR AND EXTERIOR CARGO MANAGEMENT SYSTEM

(71) Applicant: FORD GLOBAL TECHNOLOGIES, LLC, Dearborn, MI (US)

(72) Inventors: Annette Lynn Huebner, White Lake, MI (US); Artur Stanislavovich Sakarian, Ann Arbor, MI (US); Kristin Ann Hellman, Walled Lake, MI (US); Ryan Welch, Ottawa Lake, MI (US); Matthew B. Rutman, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/440,411

(22) Filed: Feb. 23, 2017

(65) Prior Publication Data

US 2018/0236945 A1    Aug. 23, 2018

(51) Int. Cl.
| | |
|---|---|
| *B60R 9/00* | (2006.01) |
| *B60R 9/045* | (2006.01) |
| *B60R 7/04* | (2006.01) |
| *B60R 7/08* | (2006.01) |
| *B60R 9/058* | (2006.01) |
| *B60R 9/08* | (2006.01) |

(52) U.S. Cl.
CPC .............. *B60R 9/045* (2013.01); *B60R 7/04* (2013.01); *B60R 7/08* (2013.01); *B60R 9/058* (2013.01); *B60R 9/08* (2013.01)

(58) Field of Classification Search
CPC ........... B60R 9/045; B60R 9/058; B60R 9/08; B60R 7/04; B60R 7/08

USPC ......................................................... 224/542
See application file for complete search history.

(56) References Cited

U.S. PATENT DOCUMENTS

| | | | | |
|---|---|---|---|---|
| 3,375,959 | A | * 4/1968 | Hamilton | .................. B60R 5/04 224/331 |
| 5,588,572 | A | * 12/1996 | Cronce | .................. B60R 9/045 224/321 |
| 6,779,696 | B2 | 8/2004 | Aftanas et al. | |
| 7,422,130 | B2 | 9/2008 | Shaukat | |
| 7,819,295 | B2 | * 10/2010 | Plavetich | ................ B60P 1/435 224/403 |
| 8,333,311 | B2 | 12/2012 | Hubbard | |
| 8,544,707 | B2 | 10/2013 | Hubbard | |
| 2004/0118886 | A1 | 6/2004 | Mirshafiee et al. | |
| 2016/0229349 | A1 | 8/2016 | Cropley et al. | |

OTHER PUBLICATIONS

"2016 Ford Escape Roof Rack by Rhino Rack"; etrailer.com; https://www.etrailer.com/multi-product.aspx?pc1=RRRS576 &vehicleid=20161400305&hhmake=Ford&hhmodel=Escape&hunter= roof&roofkit=BK_1,SKI_1,C_34,BOX_2,BAG_1,BSK_4&manuf= RHINO; pp. 1-31; printed on Nov 4, 2016.

* cited by examiner

*Primary Examiner* — Peter N Helvey
(74) *Attorney, Agent, or Firm* — Jason Rogers; Vichit Chea; King & Schickli, PLLC

(57) ABSTRACT

A cargo management system includes a roof rack, a storage compartment rack and a first cross bar. The first cross bar is displaceable between a first position carried on the roof rack and a second position carried on the storage compartment rack. Clips at the opposed ends of the cross bar allow the first cross bar to be secured in position on either rack.

18 Claims, 10 Drawing Sheets

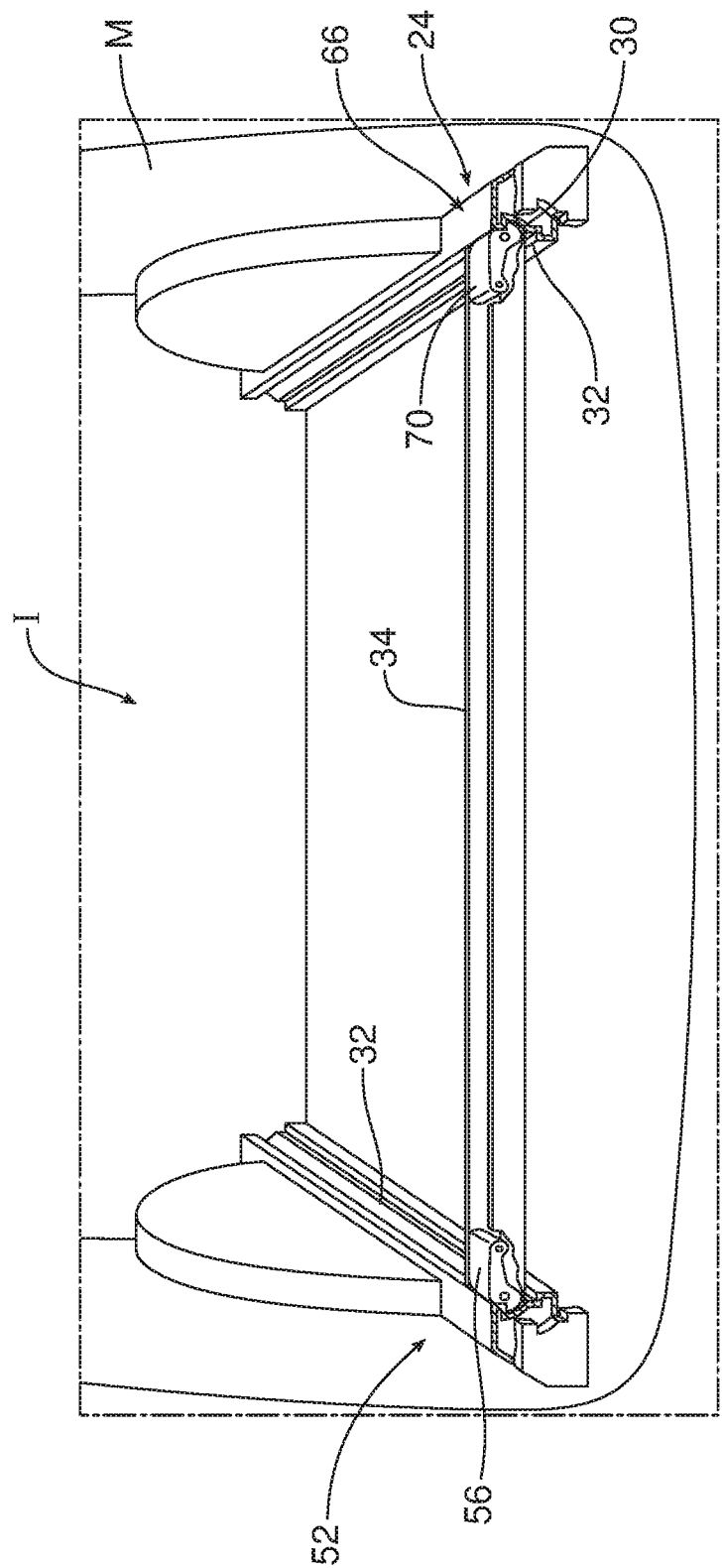

VEHICLE INTERIOR AND EXTERIOR CARGO MANAGEMENT SYSTEM

TECHNICAL FIELD

This document relates generally to the motor vehicle equipment field and, more particularly, to a cargo management system that may be adapted to a wide range of cargo transportation applications allowing one to carry and secure cargo in the interior or on the exterior of a motor vehicle.

BACKGROUND

Many owners of sport utility vehicles live active lifestyles including one or more of biking, kayaking, paddle boarding, canoeing, skiing, snowboarding, surfing and the like. Such activities require roof rack and interior cargo storage spaces with the necessary versatility to accommodate varying equipment for these activities. This document relates to a new and improved cargo management system of great versatility and adaptability allowing one to more easily transport various outdoor activity equipment and other cargo, as well as secure that cargo in the interior or on the exterior of the motor vehicle as desired.

SUMMARY

In accordance with the purposes and benefits described herein, a new and improved cargo management system is provided. Advantageously, that cargo management system allows one to secure various cargo on the exterior or in the interior of the motor vehicle equipped with that system. The cargo management system comprises a roof rack, a storage compartment rack and a first cross bar. The first cross bar is displaceable between a first position carried on the roof rack and a second position carried on the storage compartment rack. The first cross bar includes a first clip at a first end thereof.

That first clip may include a first lever having a first latch feature. Further, the first cross bar may include a first channel. The first lever nests in the first channel when in a first locked position.

A first pivot pin may connect the first lever to the first cross bar. Further, the cargo management system may include a first detent holding the first lever in the first locked position. That first detent may comprise first opposed lugs on the first lever and first opposed cooperating receivers in first opposed sidewalls of the first channel.

The cargo management system may further include a second clip at a second end of the first cross bar. That second clip may include a second lever and a second latch feature. The second lever may nest in the first channel when in a second locked position.

A second pivot pin may connect the second lever to the first cross bar. Further, the cargo management system may include a second detent holding the second lever in the second locked position. That second detent may comprise second opposed lugs on the second lever and second opposed cooperating receivers in the first opposed sidewalls of the first channel.

The roof rack of the cargo management system may include a first latch receiver and the storage compartment rack may include a second latch receiver. Further, the storage compartment rack may be integrated into storage compartment trim panels of the motor vehicle.

The cargo management system may further include a second cross bar displaceable between a third position carried on the roof rack and a fourth position carried on the storage compartment rack. The second cross bar may include a third clip at a third end and a fourth clip at a fourth end.

The third clip may include a third lever and a third latch feature. The fourth clip may include a fourth lever and a fourth latch feature. A third pivot pin may connect the third clip to the second cross bar. A fourth pivot pin may connect the fourth clip to the second cross bar.

In accordance with an additional aspect, a method is provided of managing cargo. That method comprises the steps of: (a) unlatching a first clip at a first end of a first cross bar, (b) unlatching a second clip at a second end of the first cross bar, (c) removing the first cross bar from a roof rack and (d) positioning the first cross bar on a storage compartment rack. The method may also include the step of latching the first clip and the second clip to the storage compartment rack. Once the first cross bar is secured in position, cargo may be secured to the cross bar thereby allowing the cargo to be transported while being positively restrained from movement in response to motion of the motor vehicle during transport.

In the following description, there are shown and described several preferred embodiments of the cargo management system as well as the method of managing cargo. As it should be realized, the cargo management system and related method are capable of other, different embodiments and their several details are capable of modification in various, obvious aspects all without departing from the cargo management system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the cargo management system and related method of managing cargo and together with the description serve to explain certain principles thereof.

FIG. 2 is a perspective view of the cargo management system illustrating the first cross bar connected to the storage compartment rack of the cargo management system.

Reference will now be made in detail to the present preferred embodiments of the cargo management system, examples of which are illustrated in the accompanying drawing figures.

DETAILED DESCRIPTION

Figure 1:
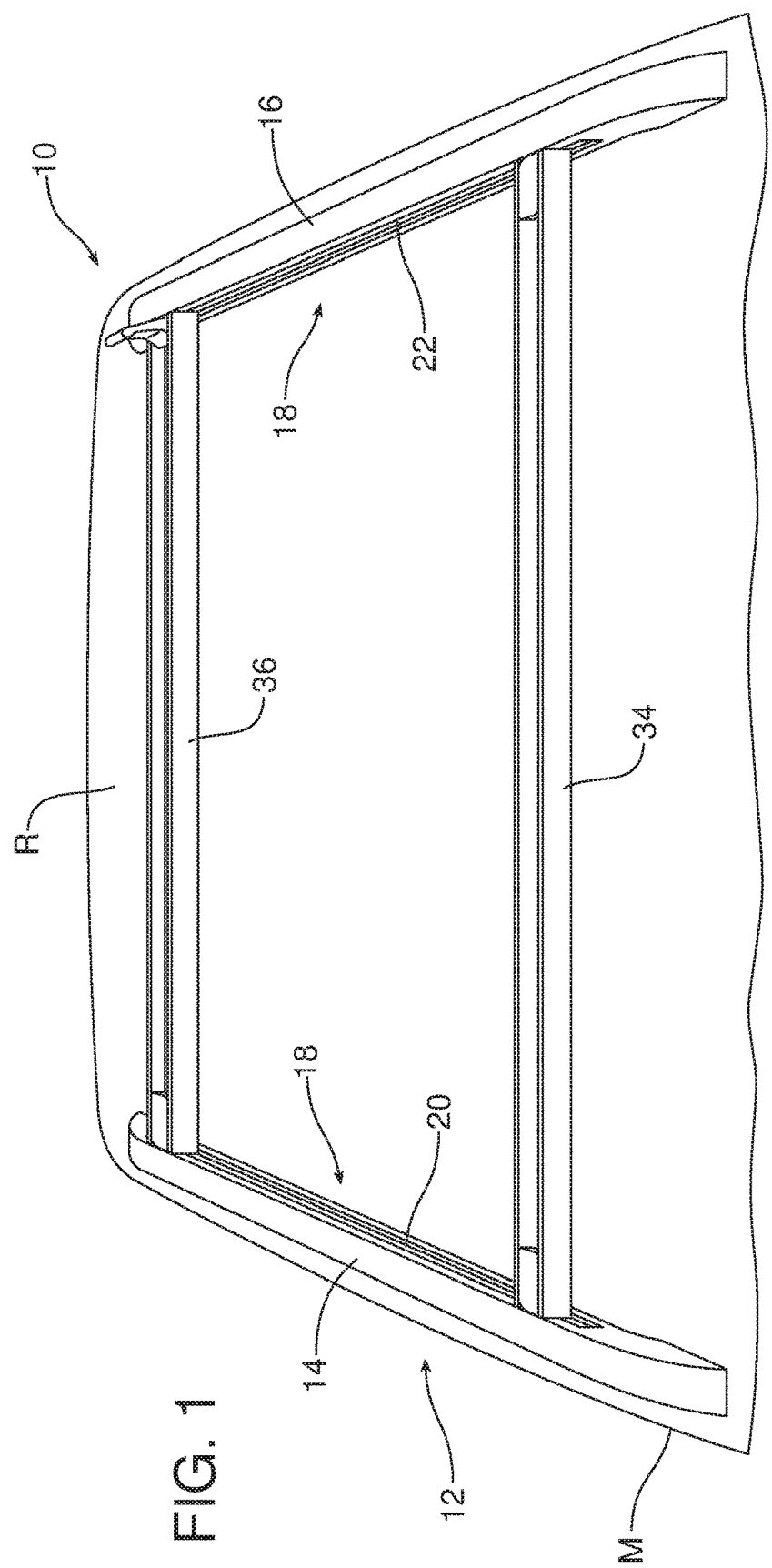
FIG. 1 is a perspective view of the cargo management system illustrating the cross bars of that system connected to the roof rack of that system.

Reference is now made to the drawing figures illustrating the cargo management system 10. As best illustrated in FIG. 1, the cargo management system 10 includes a roof rack 12 on the roof R of a motor vehicle M. The roof rack 12 includes a first side rail 14 and a second side rail 16. The roof rack 12 includes a first latch receiver 18. In the illustrated embodiment, the first latch receiver 18 comprises a first slot 20 in the first side rail 14 and a second slot 22 in the second side rail 16. The two slots 20, 22 open toward each other.

As illustrated in FIG. 2, the cargo management system 10 also includes a storage compartment rack 24 in the interior I of the motor vehicle M. In the illustrated embodiment, the storage compartment rack 24 includes a second latch receiver 30. As illustrated, the storage compartment rack 24 is integrated into the storage compartment trim panels 32 of the motor vehicle. While not shown in detail, the second latch receiver 30 comprises two opposed slots in the opposed storage compartment trim panels 32 identical to the first slot 20 and the second slot 22 best illustrated in FIGS. 3b, 3c and 4-6.

As illustrated in the drawing figures and described in greater detail below, the cargo management system 10 also includes a first cross bar 34 and a second cross bar 36. As illustrated in FIGS. 1 and 2, the first cross bar 34 is displaceable between a first position carried on the roof rack 12 (see FIG. 1) and a second position carried on the storage compartment rack 24 (see FIG. 2). Similarly, the second cross bar is displaceable between a third position carried on the roof rack 12 and a fourth position carried on the storage compartment rack 24. By displacing the first cross bar 34 and second cross bar 36 between the roof rack 12 and the storage compartment rack 24 and then securing those cross bars in position, the cargo management system 10 allows one to safely and securely transport many different types of cargo either on the roof R at the exterior of the motor vehicle M or in the storage compartment in the interior I of the motor vehicle.

Figure 3A:
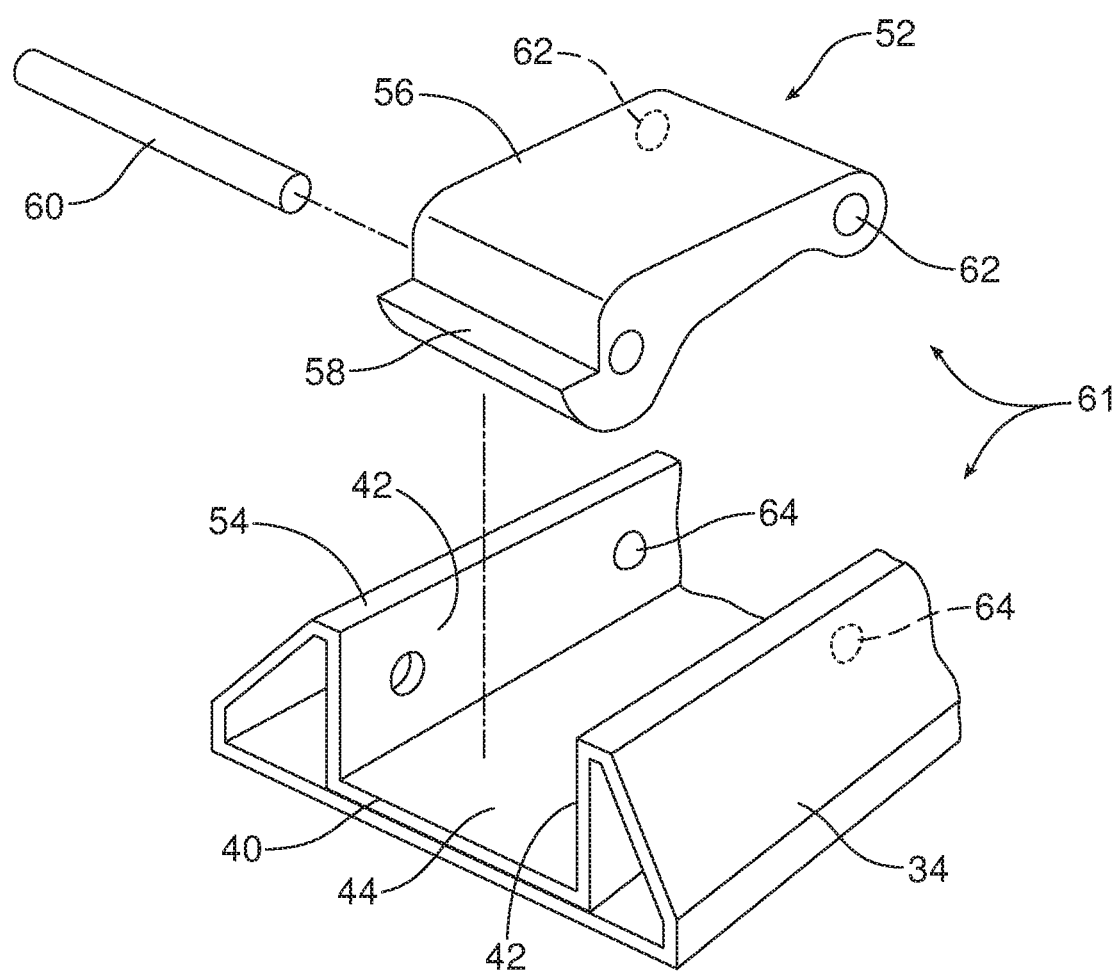
FIG. 3a is a detailed exploded perspective view illustrating the first end of the first cross bar and the first clip including the first lever, first latch feature and first pivot pin for securing the first clip to the first end of the first cross bar.

As best illustrated in FIG. 3a, the first cross bar 34 includes a first channel 40 having first opposed sidewalls 42, a bottom wall 44 and an open top.

Figure 5:
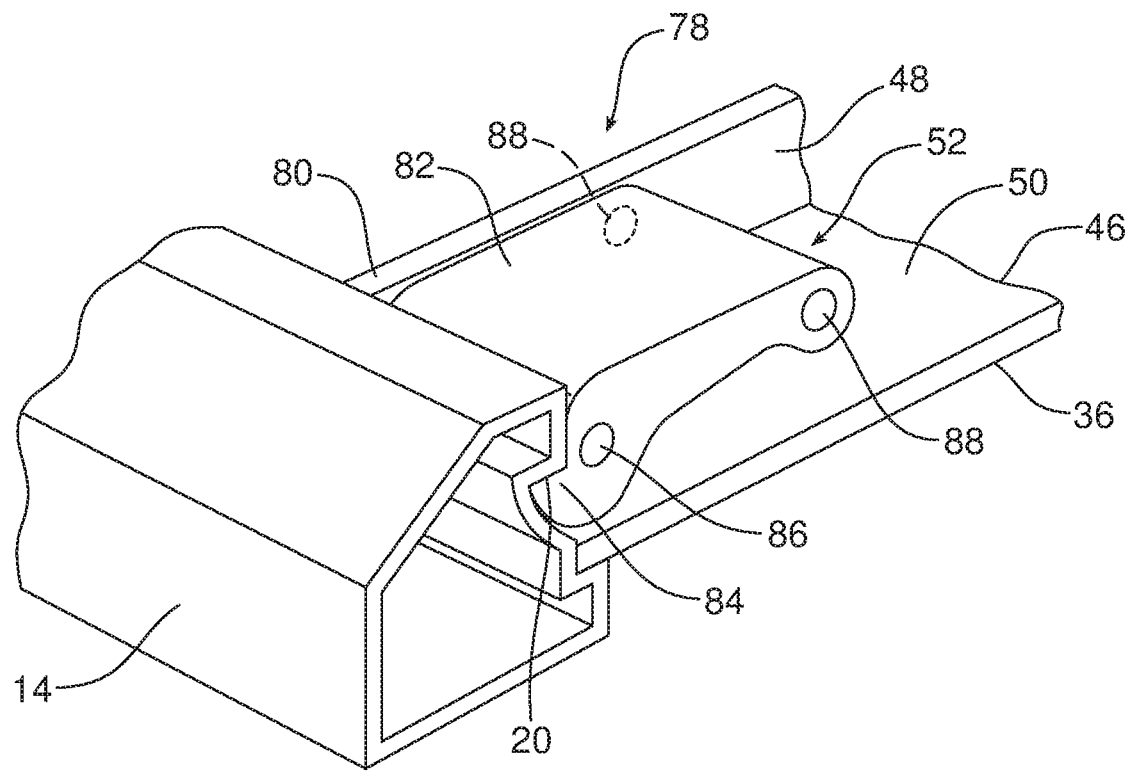
Figure 6:
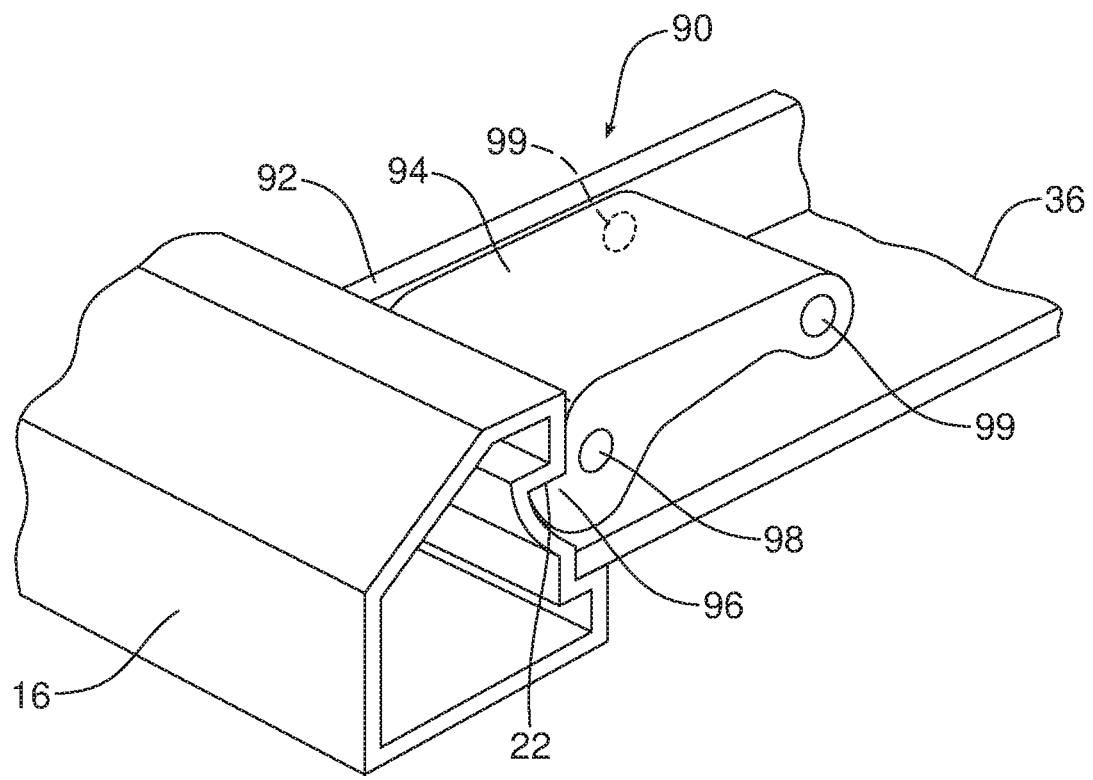

As best illustrated in FIGS. 5 and 6, the second cross bar 36 includes a second channel 46 having second opposed sidewalls 48 (only one shown for clarity) and a second bottom wall 50.

Figure 3B:
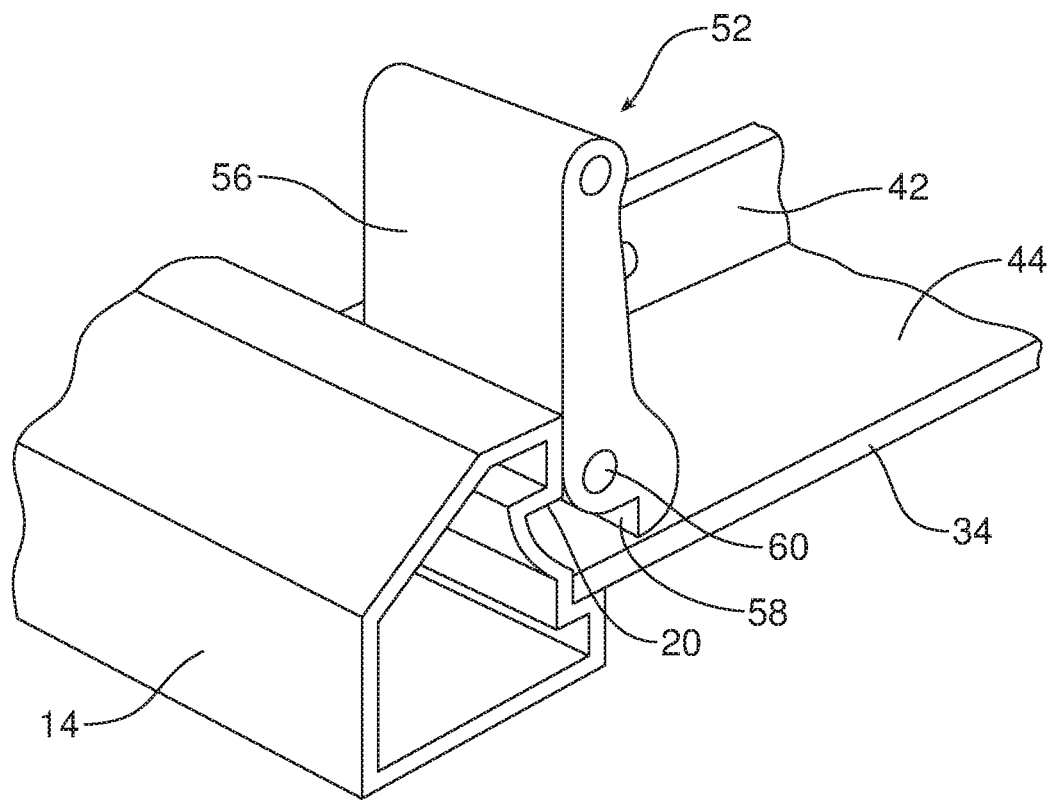
FIG. 3b is a detailed perspective view of the structures illustrated in FIG. 3a showing them assembled with the first clip in an unlocked position.
Figure 3C:
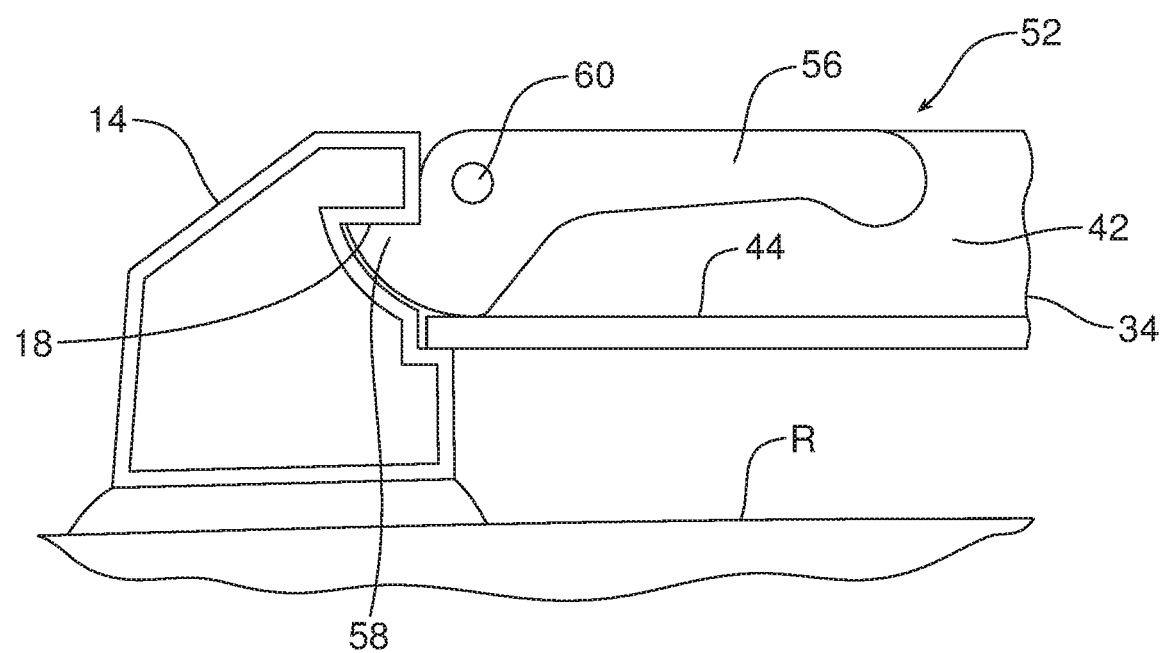
FIG. 3c is a side elevational view of the structure of FIG. 3b but showing the first clip in the first locked position wherein the first latch feature of the first clip is engaged in the receiver of the roof rack.

As best illustrated in FIGS. 3a-3c, a first clip 52 is provided at a first end 54 of the first cross bar 34. The first clip 52 includes a first lever 56 having a first latch feature 58. A first pivot pin 60 connects the clip 52 to the first cross bar 34.

As illustrated in FIGS. 3b and 3c, the first clip 52 is displaceable between an unlocked position illustrated in FIG. 3b wherein the jaw or first latch feature 58 is free of the first latch receiver 18 and, more particularly, the first slot 20 in the first side rail 14, and a locked position wherein the first jaw or latch feature 58 engages in the first latch receiver 18 or first slot 20 in the first side rail 14 (see FIG. 3c).

When in the locked position with the first latch feature 58 engaged with the first latched receiver 18, the first end 54 of the first cross bar 34 is secured to the roof rack. Alternatively, as illustrated in FIG. 2, when in the locked position, the first latch feature 58 may be engaged with the second latch receiver 30 of the storage compartment rack 24 to secure the first end 54 of the first cross bar 34 to the storage compartment rack.

A first detent, generally designated by reference numeral 61, holds the first clip 52 in the first locked position. In the illustrated embodiment, that first detent 61 comprises first opposed lugs 62 on opposite sides of the first lever 56 and first opposed cooperating dimples or receivers 64 in the first opposed sidewalls 42 of the first channel 40. As should be appreciated from reviewing FIGS. 1 and 3c, when the first clip 52 is in the first locked position, the entire first clip including the first lever 56 nests down in the first channel 40 so as to be invisible in profile so as improve aerodynamics and provide a sleek appearance.

Figure 4:
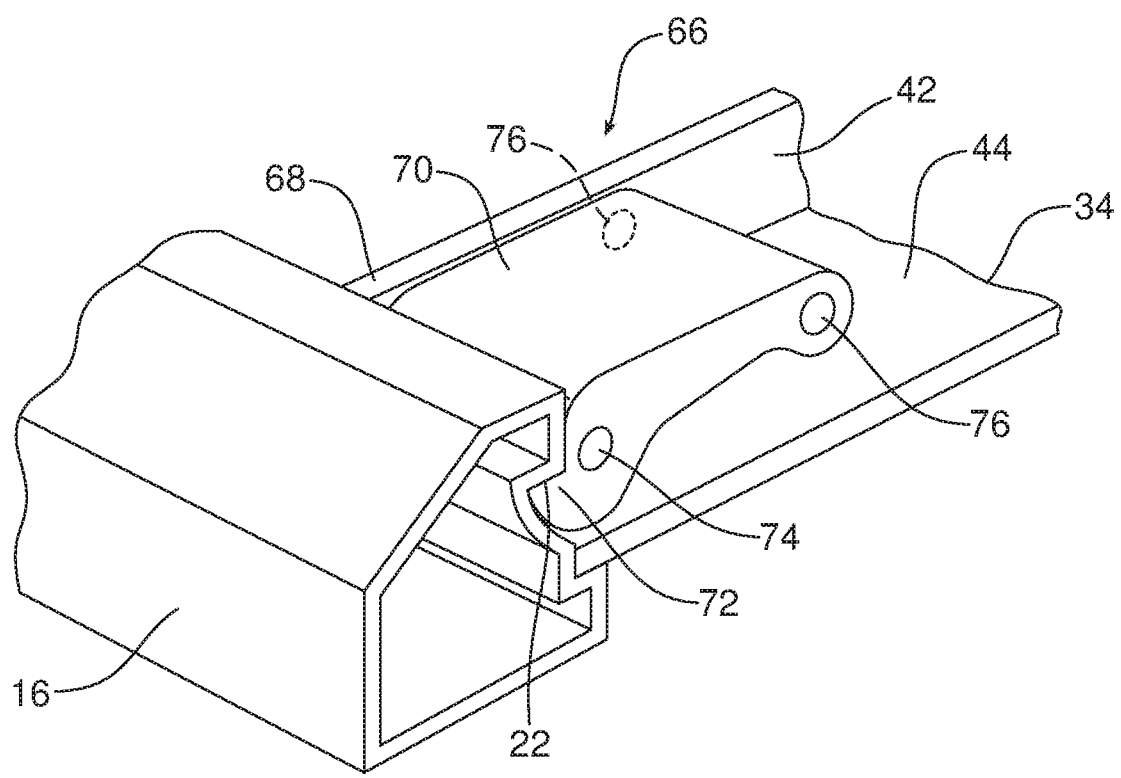
FIGS. 4-6 are respective detailed views of the second clip on the second end of the first cross bar, the third clip on the third end of the second cross bar and the fourth clip on the fourth end of the second cross bar.

As best illustrated in FIG. 4, a second clip 66 is provided at the second end 68 of the first cross bar 34. The second clip 66 is structurally identical to the first clip 52. Thus, the second clip includes a second lever 70 and a second jaw or latch feature 72. A second pivot pin 74 pivotally connects the second clip 66 to the second end 68 of the first cross bar 34. A second detent 76, with a structure identical to the first detent 61, holds the second clip 66 in the locked position nested down in the first channel 40 of the first cross bar 34. When locked with the second jaw or latch feature 72 engaged in either the first latch receiver 18 or the second latch receiver 30, the second end 68 of the first cross bar 34 may be secured to either the roof rack 12 as illustrated in FIG. 1 or the storage compartment rack 24 as illustrated in FIG. 2.

As best illustrated in FIG. 5, a third clip 78 is provided on the third end 80 of the second cross bar 36. The third clip 78 includes a third lever 82 and a third jaw or latch feature 84. The third clip 78 is connected to the third end 80 of the second cross bar 36 by means of a third pivot pin 86. The third clip 78 allows one to connect the third end 80 of the second cross bar 36 to the roof rack 12 by engagement of the third jaw or latch feature 84 with the first latch receiver 18. Alternatively, the third clip 78 allows one to connect the third end 80 of the second cross bar 36 with the storage compartment rack 24 by engagement of the third jaw or latch feature 84 with the second latch receiver 30. FIG. 5 illustrates the third clip 78 in the third locked position with the third jaw or latch feature 84 engaging with the first slot 20. A third detent 88, identical to the second detent 76 and the first detent 61 holds the third clip 78 in the locked position.

As illustrated in FIG. 6, a fourth clip 90 is secured to the fourth end 92 of the second cross bar 36. More specifically, the fourth clip 90 includes a fourth lever 94 and a fourth jaw or latch feature 96. A fourth pivot pin 98 pivotally secures the fourth clip 90 to the fourth end 92 of the second cross bar 36 so that the fourth clip is displaceable between unlocked and locked positions in the same manner as the first clip 52 in order to lock and unlock the fourth end 92 of the second cross bar 36 from the roof rack 12 and the storage compartment rack 24. A fourth detent 99 identical to the other detents 61, 76 and 88 functions to hold the fourth clip 90 in the locked position.

The cargo management system 10 is used in a method of managing cargo. That method may be described as including the step of unlatching the first clip 52 at the first end 54 of the first cross bar 34 and unlatching the second clip 66 at the second end 68 of the first cross bar so as to release the first cross bar 34 from either the roof rack 12 or the storage compartment rack 24 to which it was previously secured. The next step involves removing the first cross bar 34 from either the roof rack 12 or the storage compartment rack 24 and then positioning the first cross bar on the other of the roof rack or storage compartment rack 24.

The method then includes the step of latching or locking the first clip 52 and the second clip 66 to the other of the roof rack 12 and storage compartment rack 24 to which the user seeks to connect the first cross bar 34. The third clip 78 and the fourth clip 90 are unlatched and latched in a similar manner to remove the second cross bar 36 from one of the roof rack 12 and storage compartment rack 24 and re-secure that second cross bar to the other of the roof rack or storage compartment rack.

Once the first cross bar 34 and/or the second cross bar 36 is properly secured to either of the roof rack 12 or the storage compartment rack 24, one may then secure the cargo to be transported to the cross bar so that the cargo may be safely held in position against movement that might otherwise be imparted thereto by motion of the motor vehicle during transport from one location to another.

Figure 7:
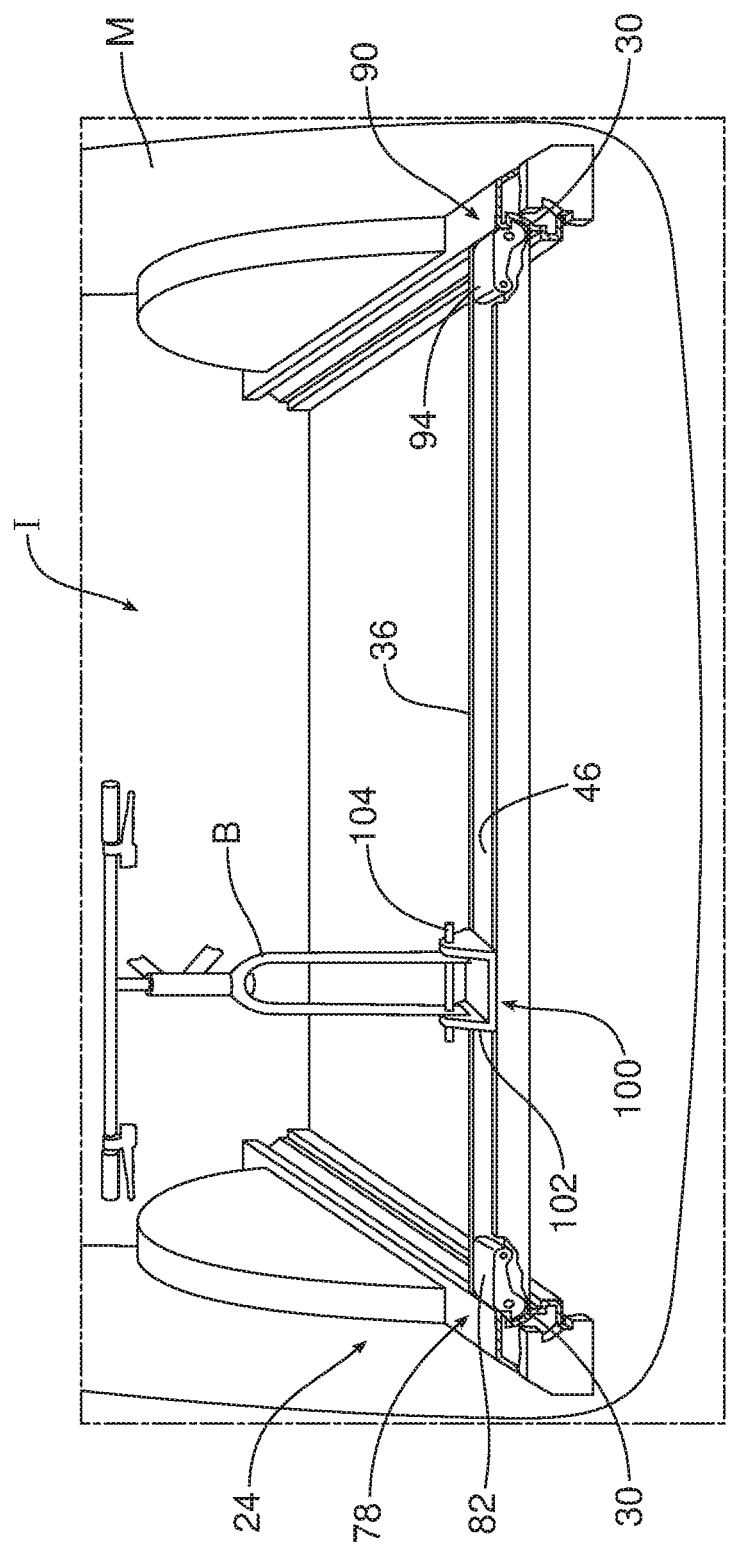
FIG. 7 is a perspective view illustrating how the cargo management system may be utilized to secure a bike in the interior storage compartment of the motor vehicle.

As illustrated in FIG. 7, a bicycle B may be secured to the second cross bar 36 in the interior I of the motor vehicle M by means of the bike fork receiver 100. As illustrated, the bike fork receiver 100 includes a yoke 102 that receives a bike fork securing pin 104 in a manner known in the art. The base of the bike fork receiver 100 sits down in the second channel 46 of the second cross bar 36 and is secured to the second bottom wall 50 by means of a fastener such as a screw or bolt (not shown).

Figure 8:
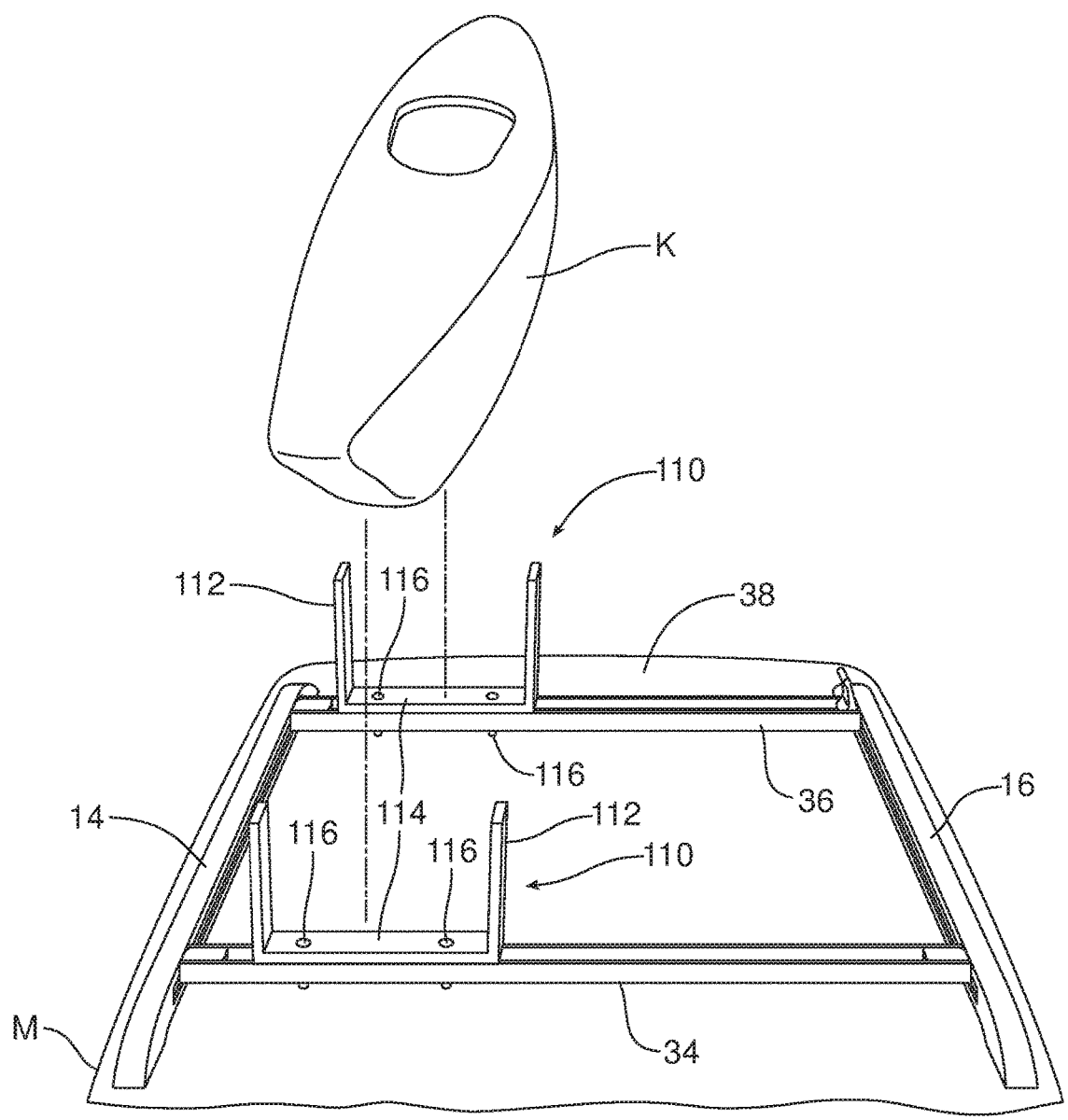
FIG. 8 is a partially exploded perspective view illustrating how a kayak may be secured to the exterior of a motor vehicle utilizing the cargo management system.

As illustrated in FIG. 8, a kayak K may be carried on the roof 38 of the motor vehicle M by means of the kayak receivers 110 secured to the first and second cross bars 34, 36 fixed to the roof rack 12 by means of the locked clips 52, 66, 78 and 90. Each kayak receiver 110 includes a yoke 112 and a base 114 secured to the respective cross bars 34, 36 by means of bolts 116. A bungee cord or other strap (not shown) may be utilized to secure the kayak in the yokes 112.

The foregoing has been presented for purposes of illustration and description. It is not intended to be exhaustive or to limit the embodiments to the precise form disclosed. Obvious modifications and variations are possible in light of the above teachings. For example, in the illustrated embodiment, the first cross bar 34 is identical to the second cross bar 36. The first clip 52, the second clip 66, the third clip 78 and the fourth clip 90 are also all identical. In other embodiments of the cargo management system 10, it should be appreciated that the first cross bar 34 and second cross bar 36 may be different in some aspect including, for example, overall shape/cross-section in order to accommodate one or more particular cargo transport applications. Further, while accommodation is only made for one cross bar 34, 36 on the storage compartment rack 24 in the embodiments illustrated in FIGS. 2 and 7, it should be appreciated that the storage compartment rack may be configured to accept both cross bars 34, 36 at the same time or order to provide two anchored cross bars to which cargo may be secured. All such modifications and variations are within the scope of the appended claims when interpreted in accordance with the breadth to which they are fairly, legally and equitably entitled.

What is claimed:

1. A cargo management system, comprising:
   a roof rack including a first side rail, a second side rail and a first latch receiver;
   a storage compartment rack including a second latch receiver; and
   a first cross bar displaceable between a first position carried on said roof rack and a second position carried on said storage compartment rack, said first cross bar including a first clip at a first end wherein said first clip engages with (a) said first latch receiver when in said first position and (b) said second latch receiver when in said second position.

2. The cargo management system of claim 1, wherein said first clip includes a first lever having a first latch feature.

3. The cargo management system of claim 2, wherein said first cross bar includes a first channel, said first lever nesting in said first channel when in a first locked position.

4. The cargo management system of claim 3, further including a first pivot pin connecting said first clip to said first cross bar.

5. The cargo management system of claim 4, further including a first detent holding said first clip in said first locked position.

6. The cargo management system of claim 5, wherein said first detent comprises first opposed lugs on said first lever and first opposed cooperating receivers in first opposed sidewalls of said first channel.

7. The cargo management system of claim 6, further including a second clip at a second end of said first cross bar.

8. The cargo management system of claim 7, wherein said second clip includes a second lever and a second latch feature.

9. The cargo management system of claim 8, wherein said second lever nests in said first channel when in a second locked position.

10. The cargo management system of claim 9, further including a second pivot pin connecting said second clip to said first cross bar.

11. The cargo management system of claim 10, further including a second detent holding said second clip in said second locked position.

12. The cargo management system of claim 11, wherein said second detent comprises second opposed lugs on said second lever and second opposed cooperating receivers in said first opposed sidewalls of said first channel.

13. The cargo management system of claim 12, wherein said storage compartment rack is integrated into storage compartment trim panels of a motor vehicle.

14. The cargo management system of claim 13, further including a second cross bar displaceable between a third position carried on said roof rack and a fourth position carried on said storage compartment rack, said second cross bar including a third clip at a third end.

15. The cargo management system of claim 14, further including a fourth clip at a fourth end of said second cross bar.

16. The cargo management system of claim 15, wherein said third clip includes a third lever and a third latch feature and said fourth clip includes a fourth lever and a fourth latch feature.

17. The cargo management system of claim 16, further including a third pivot pin connecting said third clip to said second cross bar and a fourth pivot pin connecting said fourth clip to said second cross bar.

18. The cargo management system of claim 1, wherein said first latch receiver includes a first slot in said first side rail.

* * * * *